United States Patent [19]

Wygant

[11] 4,319,319
[45] Mar. 9, 1982

[54] PROGRAMMABLE TIME CONTROL APPARATUS

[75] Inventor: N. D. Wygant, Littleton, Colo.

[73] Assignee: Marathon Oil Company, Findlay, Ohio

[21] Appl. No.: 115,869

[22] Filed: Jan. 28, 1980

[51] Int. Cl.³ .................... G06F 15/46; H01H 43/00
[52] U.S. Cl. .................... 364/104; 340/309.1; 340/309.4
[58] Field of Search .................... 364/104; 340/309.1, 340/309.4, 309.5; 307/41, 141, 141.4, 293

[56] References Cited

U.S. PATENT DOCUMENTS

| | | | |
|---|---|---|---|
| 3,903,515 | 9/1975 | Haydon et al. | 340/309.4 |
| 4,079,366 | 3/1978 | Wong | 340/309.1 X |
| 4,081,754 | 3/1978 | Jackson | 340/309.4 X |
| 4,093,992 | 6/1978 | Kawamura et al. | 364/705 |
| 4,110,632 | 8/1978 | Wyland | 307/141 X |
| 4,223,379 | 9/1980 | Simcoe | 364/104 |

Primary Examiner—Jerry Smith
Attorney, Agent, or Firm—Jack L. Hummel

[57] ABSTRACT

The controlling of the operation of a plurality of different electrically actuated load devices at the desired time is solved in a simple and economical manner by the control apparatus of the present invention. The control apparatus disclosed includes a real-time clock with a selected total time span and with a selected time resolution. The apparatus has programmed control inclusive of interchangeable programmed memory modules and an alternate manual control of all control outputs for controlling the load devices in the desired time sequence.

1 Claim, 6 Drawing Figures

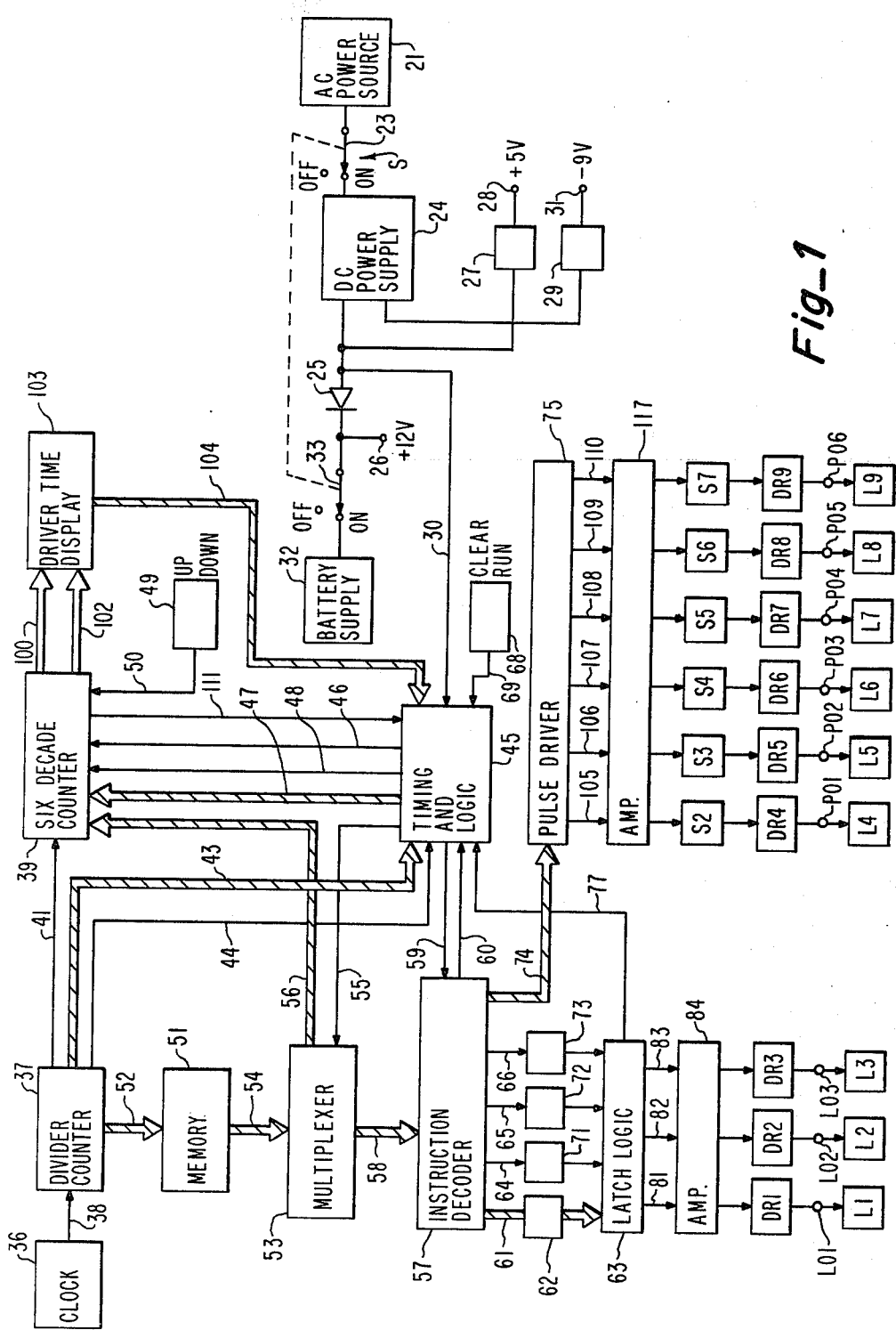
Fig_1

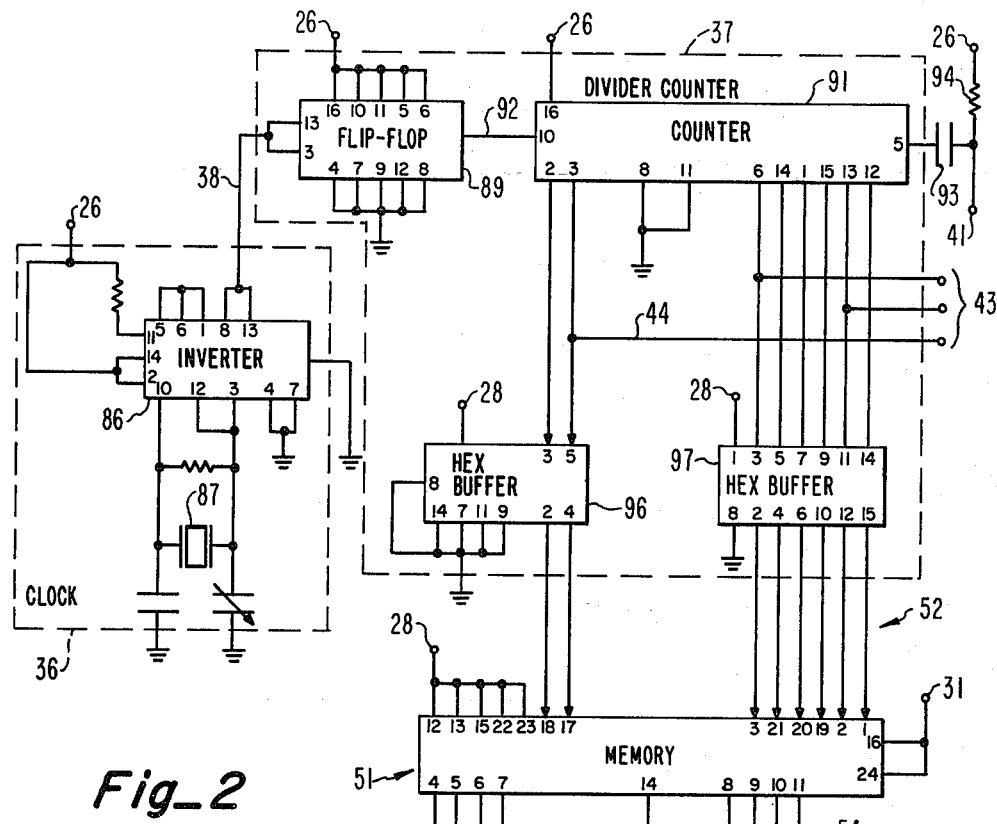
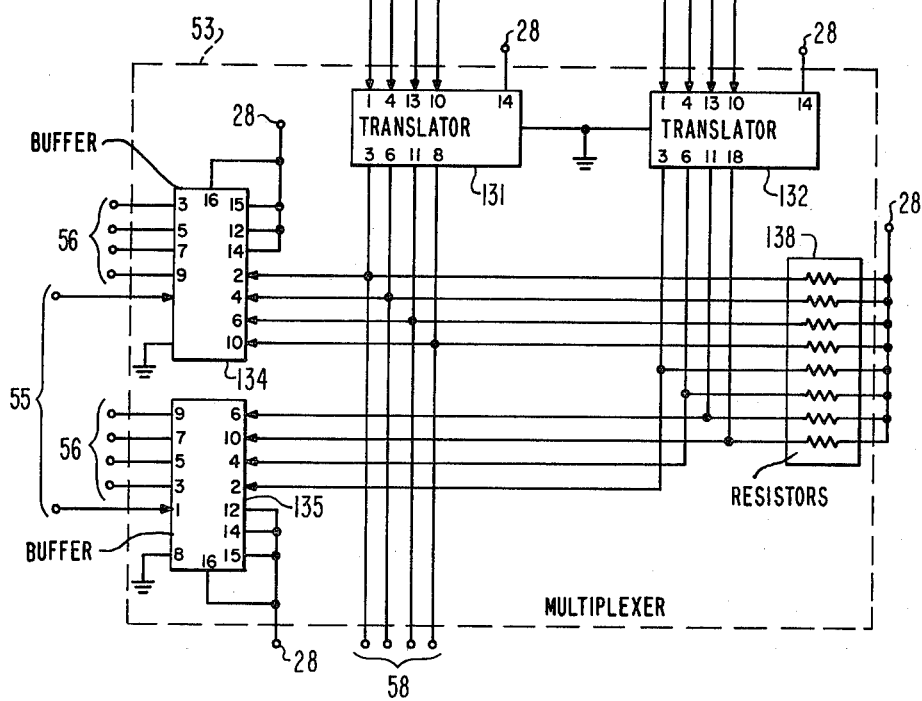
Fig_2

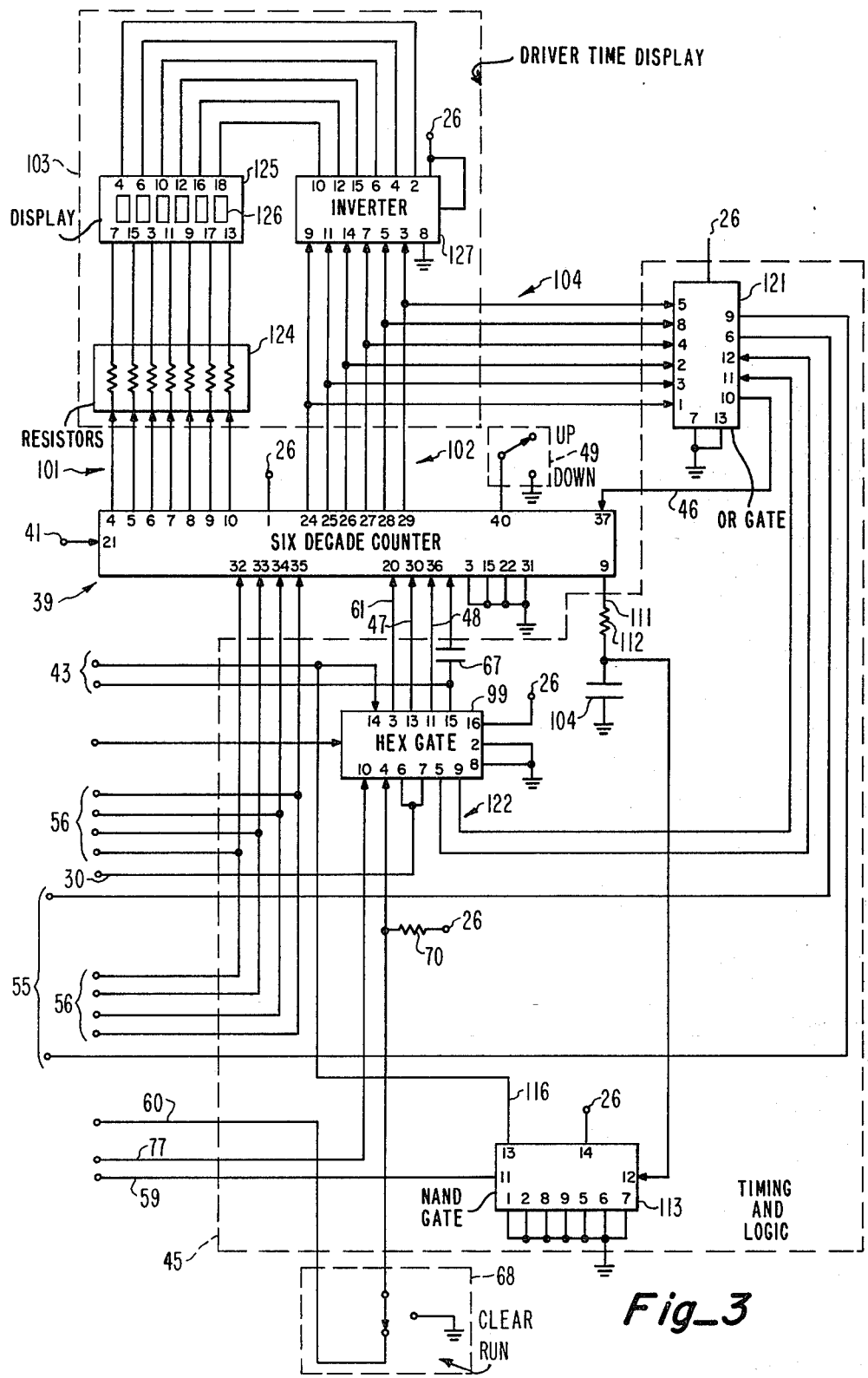
Fig_3

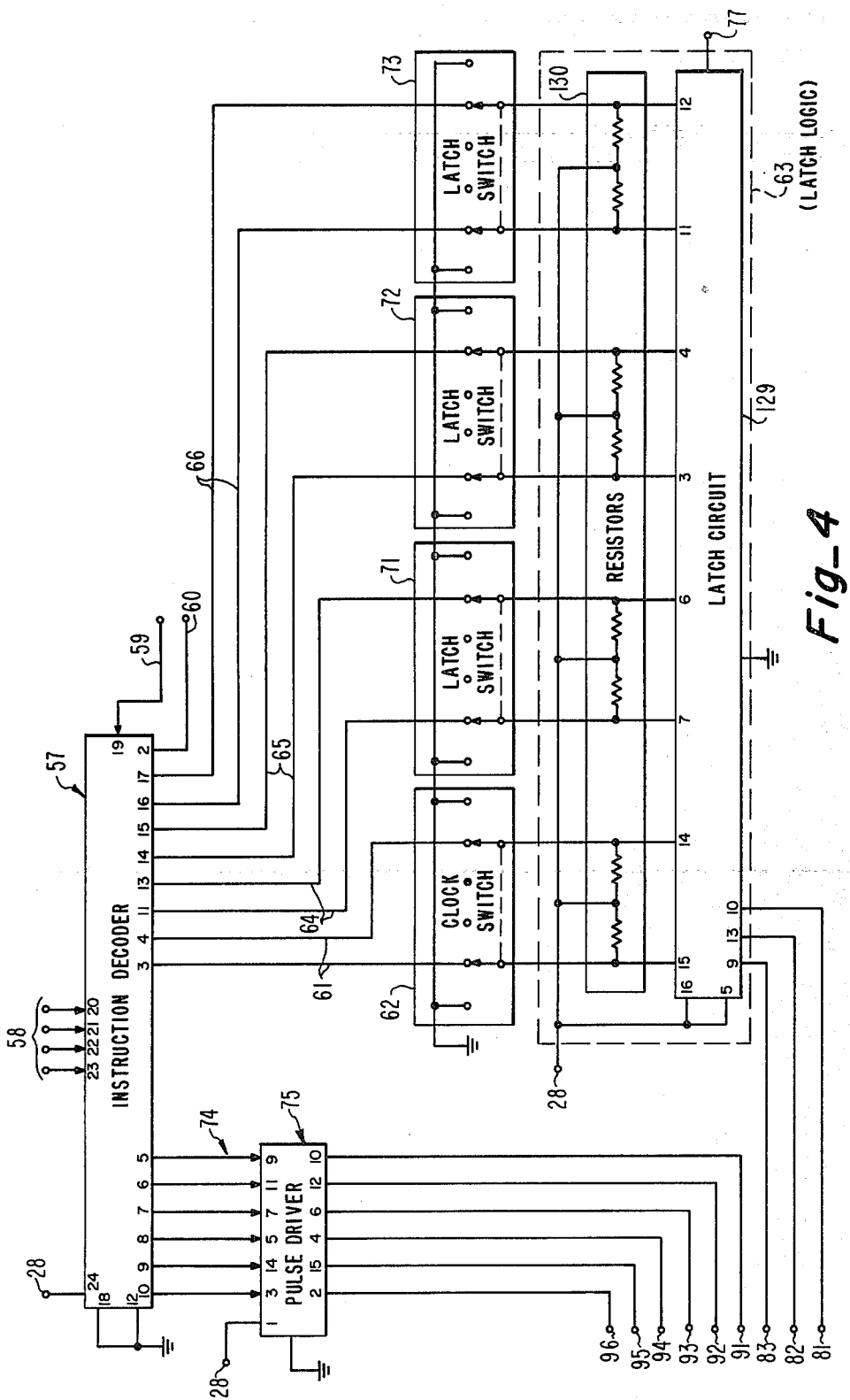

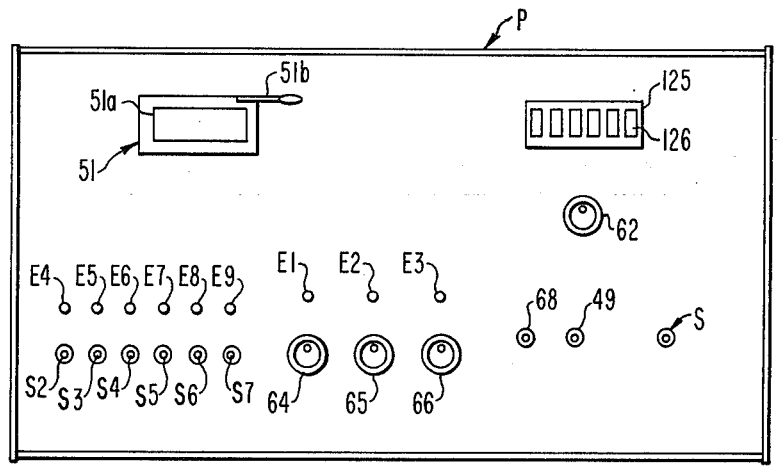
Fig_6
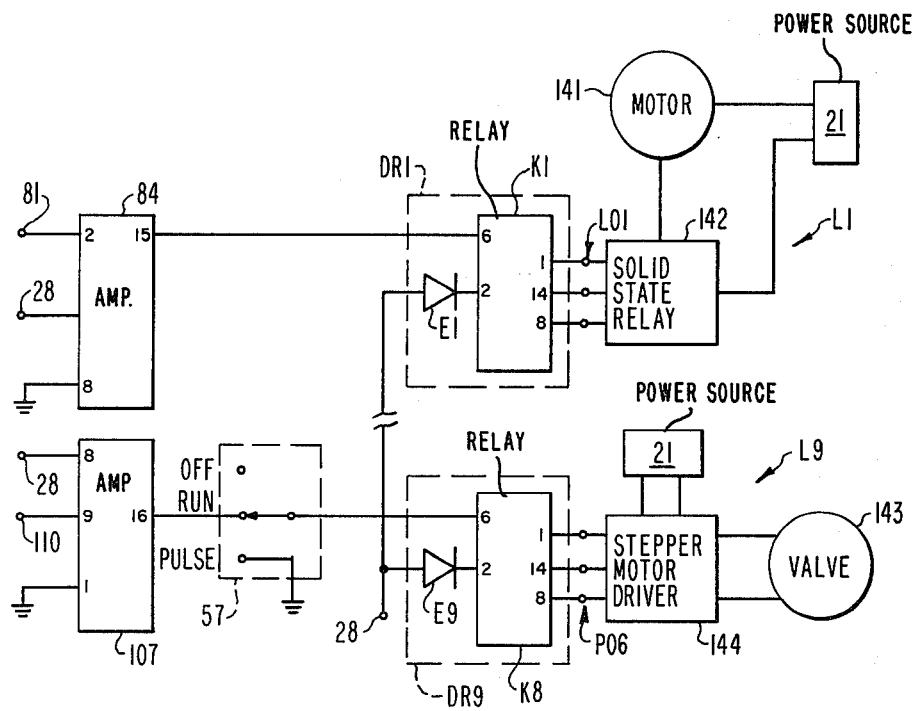
Fig_5

PROGRAMMABLE TIME CONTROL APPARATUS

TECHNICAL FIELD

This invention relates to a novel and improved electronic programmable time control apparatus suitable for providing a plurality of electric control outputs for use in controlling the operation of a plurality of load devices at times programmed by the operator.

BACKGROUND ART

A simple, economical, electric control apparatus for automatically controlling laboratory experiments such as core flooding projects was not previously available. The prior art includes mechanical-electrical timers, programmable drum electrical-mechanical timers, punched or marked card programmable timers, and hybrid techniques using staged timing relays. U.S. Pat. No. 3,909,620 discloses a control system that utilizes a combination of a timer device and switching circuit which can be controlled manually or by a control signal supplied by a timer. This system, however, does not utilize a similar timing, programmed storage, and decoding combination with a current time display and a load operation display for controlling the operation of a plurality of loads in a selected time sequence.

DISCLOSURE OF INVENTION

Electronic control apparatus is disclosed that is programmed to produce a plurality of electric control outputs in a selected time sequence to automatically start, change, and stop the operation of a plurality of load devices in a selected time sequence over a selected total time span that are established by a selected program. The apparatus disclosed is particularly suited for automatically controlling laboratory experiments, such as core flooding projects.

Each program has instructions which include an arrangement of operational steps and specific times. The timing and instructions for the individual operations are stored in a memory. Time programs can be changed during an ongoing operation by preparing another memory and inserting it into place in the apparatus. Recurring operations can be stored in different memories for future use.

BRIEF DESCRIPTION OF DRAWINGS

The details of this invention will be described in connection with the accompanying drawings, in which:

FIG. 1 is a block diagram showing control apparatus with an electric power supply embodying features of the present invention;

FIG. 2 is a circuit diagram showing in more detail the clock, divider-counter, memory, multiplexer;

FIG. 3 is a circuit diagram showing in more detail the six-decade counter, driver-time display, and timing and logic circuits;

FIG. 4 is a circuit diagram showing in more detail the instruction decoder, pulse driver and manual control switches and latch logic circuits;

FIG. 5 is a circuit diagram showing a latch output circuit and terminal and pulse output circuit and terminal, each connected to a load device; and FIG. 6 is a front elevation view of the control box and control panel embodying features of the present invention.

DETAILED DESCRIPTION

Referring now to FIG. 1, electronic programmable control apparatus embodying features of the present invention is shown in block diagram form and will first be described generally with reference to this generalized block diagram, followed by a more detailed description of circuitry suitable for use in each block in the practice of the present invention. Reference is also made to the box shown in FIG. 6 having a control panel P on which a number of the elements are mounted and which has output plugs for the control outputs on the back.

The electric power for actuating the various electric circuits hereinafter described is taken from an external AC electric power line or source designated 21. The power from source 21 is connected via an inlet plug on the back of the box (not shown) via one set of on-off contacts 23 of a double-pole, double-throw DPDT manual power control electric on-off switch S to a DC power supply 24. On-off switch S is mounted on the control panel P. DC power supply 24 converts AC line power to the several different regulated DC voltages.

In the embodiment shown, the power supply 24 converts 115 V AC to a regulated +12 V DC and −12 V DC. The +12 V DC is connected via a diode 25 to a DC output terminal 26. The +12 V DC is also applied to a circuit 27 which includes a heat sink and filter capacitors that reduce the voltage to +5 V DC at a DC output terminal 28. The −12 V DC output from the power supply 24 is reduced by a circuit 29 which may include a Zener diode, a current limiting resistor connected in series, and a capacitor connected across the resistor to reduce the voltage to −9 V DC at a DC output terminal 31.

A battery supply 32 is provided as a backup electric power supply. Battery supply 32 is connected to the +12 V DC output terminal 26 via the other set of on-off contacts 33 of the power control electric switch S. The contacts 23 and 33 of the power control switch S are mechanically connected, as indicated by dashed lines, to be simultaneously moved to the open position or the closed position according to the manual setting of switch S. The battery supply 32 may include a Globe gel cell connected in series with a resistor together with a diode connected across the resistor so that, when the contacts 23 and 33 are in the on or closed position shown, a trickle charge is supplied to the cell. In the event the AC power source 21 fails, then +12 V DC is supplied by the battery supply 32 to DC output terminal 26. It is noted that during the loss of AC power there is no voltage in terminals 28 and 31 so that the six-decade counter 39 stops counting, and on return of the power the counter starts counting.

The control apparatus shown includes a clock 36 connected to a divider-counter 37 by line 38. The clock is a reference frequency oscillator providing an accurate reference frequency output for timing and other sync outputs for performing a variety of control operations, as hereinafter described.

The divider-counter 37 divides the reference frequency output into several selected frequency outputs which include a scan output connected to a six-decade counter 39 by line 41, as well as sync and timing outputs coupled by lines 43 and a clock output connected by line 44 to timing and logic circuits designated by numeral 45.

The timing and logic circuits 45 in turn have sync and timing outputs connected by lines 47 and a clock output connected by line 48 to the six-decade counter 39. An up-down electric control switch 49 mounted on panel P is connected to the six-decade counter 39 by line 50. The divider-counter 37 produces a plurality of address outputs that are connected to a memory 51 by line 52.

The memory 51 produces instruction data and timing outputs that are connected to a multiplexer 53 by lines 54. A timing and logic output is connected to the multiplexer 53 from the timing and logic circuit 45 by line 55. The multiplexer produces multiplexed time data output that are connected by lines 56 to the six-decade counter 39. Multiplexed instruction data and timing outputs are connected to an instruction decoder 57 by lines 58. A synchronous or strobe output is connected to the instruction decoder 57 from the timing and logic circuits 45 by line 59. A clear output is connected to the timing and logic circuits 45 by line 60.

Generally stated, the memory 51 is programmed with instruction data and time data for the plurality of loads being controlled and the instruction decoder 57 under the control of the timing and logic circuits 45 converts the information in the memory 51 to a plurality of control outputs at output terminals of the decoder 57, which in turn provide load control outputs at output terminals designated L01 through L03 and P01 through P06, inclusive.

The instruction decoder 57 produces clock control outputs connected by lines 61 via a clock control switch 62 to latch logic 63 as well as latch control outputs connected by lines 64, 65, and 66, respectively, via latch control switches 71, 72 and 73, respectively, to the latch logic 63. Pulse control outputs from the instruction decoder 57 are connected by line 74 to a pulse driver 75. The latch logic 63 also produces a clock inhibit output resulting from an output over line 61 from the instruction decoder 57 that is connected by line 77 to the timing and logic circuits 45 to stop the output of the six-decade counter 39 according to instructions from the memory 51.

A clear-run switch 68 is connected to the timing and logic circuits 45 by line 69 and in the run position connects the clock inhibit output from the latch logic 63 to the six-decade counter.

The latch logic 63 has latch outputs over three lines 81, 82 and 83 that are amplified by amplifier 84 and then connected by corresponding lines to display-relays DR1, DR2 and DR3, respectively, from which there are provided three separate and independent load control latch outputs at output terminals L01, L02, and L03, respectively. Loads L1, L2 and L3 are shown connected to output terminals L01, L02, and L03, respectively.

The pulse driver 75 has six pulse outputs connected over six separate lines 105, 106, 107, 108, 109 and 110 that are amplified by amplifier 117 and then connected by corresponding lines through manual pulse control electric switches S2, S3, S4, S5, S6 and S7, respectively, to display-relays designated DR4, DR5, DR6, DR7, DR8 and DR9, respectively. The display-relays DR4 through DR9 then provide six separate and distinct load control pulse outputs at output terminals designated P01, P02, P03, P04, P05 and P06, respectively. In turn, output terminals P01 through P06 are shown as connected to loads designated L4 through L9, respectively.

With reference to FIG. 2, the clock 36 shown includes a dual complementary pair and inverter circuit 86 having a quartz crystal 87 connected across two of the terminals of circuit 86 so that clock 36 may be characterized as a crystal clock. For the circuit 86 shown the reference frequency output over line 38 is 32.768 KHz.

The divider-counter 37 includes a dual JK flip-flop circuit 89 that divides by two to produce a 16.384 KHz output that is coupled to the input of a fourteen-stage binary ripple counter circuit 91 by line 92. Counter circuit 91 divides the output from flip-flop circuit 89 into a plurality of outputs having selected fixed frequencies. A scan output of 2.048 KHz over line 41 to the six-decade counter 39 is provided by one output of counter circuit 91 via capacitor 93. A bias resistor 94 is connected between line 41 and power terminal 26.

A clock or reference time output of 1 KHz from circuit 91 is coupled by line 44 to the hex gate 99 and two sync and timing outputs are coupled by lines 43 to hex gate 99 in the timing and logic circuits.

The outputs of counter circuit 91, except that applied over line 41, are address outputs which are coupled via two hex buffer/converter (non-invert) circuits 96 and 97 to memory 51 by lines 52. Proceeding from left to right, the fixed frequency outputs from the counter circuit 91 in the embodiment herein described are 2 KHz, 1 KHz, while the other outputs divide the input frequency of 16.384 KHz by 32, 256, 1024, 512, 64, and 128, respectively.

This six-decade counter 39, shown in FIG. 3, is a six-decade counter-display decoder circuit which receives a scan output from the divider-counter over line 41. The six-decade counter also receives a 4-bit multiplexed time data output over four lines 56 from the buffers 134, 135 of multiplexer 53. The clock output over line 44 is connected via the hex gate 99 by line 48. The sync and timing outputs are connected over lines 43 to circuit 99 via circuit 97 into counter circuit 39 via line 47.

The six-decade counter 39 also receives a clock inhibit output from the triple 3 input OR gate 121 by line 46. This clock inhibit signal is produced as an output from the latch logic 63 and connected by line 77 as an input into the hex gate 99, which in turn produces an output connected by a pair of lines 122 into the triple OR gate 121. In turn, OR gate 121 connects the clock inhibit output over line 46 to counter circuit 39.

The six-decade counter circuit 39 includes a compare register and storage latches with the compare register comparing on a 4-bit basis all the multiplexed time data in memory 51 received from the multiplexer 53 over lines 56 with the clock or reference time over line 44 every second. When the clock or reference time and the memory times are equal, a synchronous or strobe output is generated over line 111 which is connected via a resistor 112 and via a NAND gate 113 and in turn is connected by line 59 to the instruction decoder 57. A capacitor 104 is shown connected between resistor 112 and ground. One of the sync and timing outputs from one of lines 43 is connected to the NAND gate 113 by line 116. The manual control up-down electric switch 49, located on the control panel P, is connected to an input of hex gate 99 and is shown as having up and down positions to allow the user to cause the counter 39 to count up or down.

The counter 39 has seven segment outputs connected over lines 101, one for each display element, each of which is coupled via a current limiting resistor in a resistor bank 124 to an input of a time display unit 125 of the driver-time display 103.

The counter 39 also has six digit outputs over lines 102 that are coupled via a hex buffer inverter circuit 127 to six digit inputs of the time display unit 125. The hex buffer inverter circuit 127 serves to invert and amplify the digit outputs for use by the time display unit 125.

The time display unit 125 is of a conventional construction with seven display elements each of which has seven segments 126 arranged as two boxes, one above the other, that are illuminated to display numbers 0 through 9. Proceeding from right to left, the display elements display seconds, tens of seconds, minutes, tens of minutes, hours, tens of hours.

The time display unit 125 provides a continual visual readout of time in hours, minutes and seconds operating over a total time span of 99 hours, 59 minutes and 59 seconds with one second resolution.

The six digit outputs from counter 39 are connected by lines 104 into the OR gate 121. The OR gate 121 also produces timing and logic outputs over lines 55 that are connected to buffers 134 and 135 of the multiplexer 53.

The memory 51 is an electrically programmable read-only "plug-in" memory module (EPROM) in the embodiment shown and described herein. There are 256 words or locations in the memory locations or eight bits. Hence, there are sixty-four output instructions available. Addresses and instructions are hexadecimal. The program worksheet is arranged as follows:

| Address | Time & Instr. | Program |
|---------|---------------|---------|
| 00 | hr. | |
| 01 | min. | |
| 02 | sec. | |
| 03 | instr. | |

The time and instruction must be coded in the order shown on the work sheet. However, the times do not have to be in sequential order since the entire memory 51 is scanned every second. Thus, instructions can be added at the end of an existing program without reordering the steps. The column for program allows the user to designate the function being performed. For example, "turn on pump A". Any number of outputs may be programmed for the same time and as often as required. The only limitation for the embodiment herein described is that the total output instructions cannot exceed sixty-four.

The order of output instructions is: (1) two digits for hours; (2) two digits for minutes; (3) two digits for seconds; (4) two digits for instruction. Hex representation is used for writing memory and the ranges for ten locations are: (1) 00 to 99 hours; (2) 00 to 59 minutes; (3) 00 to 59 seconds; (4) 00 to 0F output instructions.

Designations for output instructions are as follows:

| Instruction Code | Function of Instruction Code |
|------------------|------------------------------|
| 00 | NOP - no operation same as erased memory |
| 01 | Clear Clock - hours, minutes, seconds cleared to zero |
| 02 | NOP - no operation same as erased memory |
| 03 | Stop Clock - time is stopped |
| 04 | DR4 energized for 4ms |
| 05 | DR5 energized for 4ms |
| 06 | DR6 energized for 4ms |
| 07 | DR7 energized for 4ms |

| Instruction Code | Function of Instruction Code |
|------------------|------------------------------|
| 08 | DR8 energized for 4ms |
| 09 | DR9 relay energized for 4ms |
| 0A | DR1 energized |
| 0B | DR1 de-energized |
| 0C | DR2 energized |
| 0D | DR2 de-energized |
| 0E | DR3 energized |
| 0F | DR4 de-energized |

The memory 51 can be read when connected in the circuit. The memory 51 shown on the control panel P in FIG. 6 is an interchangeable module 51a that is released from the circuit by operating a lever 51b. Writing (programming) and erasing are done externally. Through the transparent lid, the user can expose the memory module to ultraviolet light to erase the bit patterns. Programs are retained indefinitely until erased.

Referring now to FIG. 2, there are eight instruction data and time data outputs connected over eight lines shown coming from the memory 51. Four of these outputs are connected to a level translator/buffer circuit 131 and the remaining four outputs are connected to a level translator/buffer circuit 132. The four outputs of circuit 131 are connected to four inputs of a tri-state hex buffer circuit 134 and the four outputs of circuit 132 are connected to four inputs of a tri-state hex buffer integrated circuit 135.

The eight outputs from circuits 131 and 132 are split by circuits 134 and 135 into two 4-bit words. These outputs from circuits 134 and 135 are connected over lines 56 to the six-decade counter 39 to provide multiplexed time data output for the six-decade counter 39. A bank of pull-up resistors 138 is shown connected between the bias voltage terminal 28 and the outputs of buffers 131 and 132. The 4-bit word instruction data and time data outputs from buffer 131 are coupled over four lines 58 into the instruction decoder 57 so that a buffered instruction data and time data is connected from the memory 51, via the block 53 represented as the multiplexer, directly to the instruction decoder, so that lines 54 in FIG. 1 could be represented as passing through a buffer and directly into the instruction decoder from the memory.

As shown in FIG. 4, the instruction decoder 57 is an 8-bit parallel-out serial shift register circuit that receives the buffered 4-bit instruction data and time data output from the multiplexer 53 over lines 58. In addition, the instruction decoder receives a synchronous or strobe output from the NAND gate 113 over line 59, as above discussed. The decoder 57 decodes the 4-bit instruction data output into sixteen outputs over sixteen lines arranged as a group of six lines 74 connected to the pulse driver 75 having outputs over six lines 91-96 and a group of six lines arrayed as line pairs 64, 65 and 66. Generally, the instruction decoder 57 functions to direct the plurality of outputs at its output terminals to the appropriate load device at the programmed times.

The instruction decoder 57 also has a clear output connected by line 60 via manual control electric switch 68 to an input to hex gate 99; from hex gate 99 the clear output is connected to counter 39 by line 61. This clear output is used to reset counter 39 to zero.

Two additional lines 61 connect from the instruction decoder to manual control clock switch 62 to apply a clock inhibit output via line 77 into the hex gate 99. The clock inhibit output is connected via the OR gate 121 over lines 122 to counter 39 to stop the counter 39 from counting according to an instruction in the program.

The latch logic 63 shown includes a quad three state NAND R/S latch circuit 129 having eight inputs connected in pairs to two outputs of the instruction decoder via switches 62, 71, 72 and 73. This latch has three outputs over three pairs of line inputs connected to six outputs of the instruction decoder via three-position run, on, off, manually operable electric switches 71, 72 and 73, one for each line pair.

The latch produces three control outputs over lines 81, 82 and 83 at the programmed times, one for each latch switch that controls three load relays described herein. A bank of resistors 130 is arranged so that there is a resistance across each of the inputs to the latch from each of switches 62, 71, 72 and 73.

There is a display and load control device (DR1-DR9) associated with each control output from the instruction decoder 57.

One display and load control device DR1 for latch output L01 is shown in FIG. 5 to include a single-pole double-throw SPDT relay K1 having an input connected to the amplifier 84. A typical load device L1 shown in FIG. 5 is a motor 141 supplied by 115 V AC power and directly controlled by a solid state relay 142. Motor 141 could be a pump, solenoid, strip chart recorder, etc.

A light-emitting diode E1 is located on the panel P and is electrically connected between a bias voltage terminal 28 and another input to the relay K1 to provide a visual indication that the relay K1 is actuated. Each relay has three output terminals designated L01 such that when connected to a load device they will either actuate the load device or not actuate the load device, depending on whether or not the relay K1 is turned on by a signal from the instruction decoder. When the output is present at P01 the associated light E1 is activated as a display to tell the operator a particular load device is in operation.

Another of the load control and display devices DR9 associated with pulse output P06 is shown in FIG. 5 to include a single-pole double-throw SPDT relay K8 having an input connected to amplifier 107. A typical load device L9 shown in FIG. 5 is a valve 143 with a stepper motor drive 144 powered by a 115 V AC source 21. The relays connected in this manner serve to isolate the loads from the control outputs of the decoder.

EXAMPLE

The following example demonstrates some of the features of the control apparatus for a typical core flooding experiment. A sandstone core is to be flooded with three different fluids, sequentially, during a total period of twenty-eight hours. One load device is a pump for injecting fluids into the core that is turned on at the beginning and off at the end of the experiment. Another load device is a valve that controls the fluids being injected and must be rotated to desired positions. Yet another load device is a strip chart recorder that records the pressure data during the experiment and is turned off fifteen minutes after the pump is turned off. The strip chart recorder has an event marker to indicate when a new fluid is injected into the core by the valve.

The sequential time program for the control apparatus is:

| hr | min | sec | instr | Output Instruction |
|----|-----|-----|-------|--------------------|
| 00 | 00 | 01 | 0A | Turn on pump with output at LO1 |
| 00 | 00 | 01 | 0C | Turn on recorder with output at LO2 |
| 00 | 00 | 10 | 04 | Rotate valve to position 1 for fluid 1 with output at PO1 |
| 00 | 00 | 10 | 05 | Activate event marker with output at PO2 |
| 08 | 00 | 06 | 04 | Rotate valve to position 2 for fluid 2 with output at PO1 |
| 08 | 00 | 06 | 05 | Activate event marker with output at PO2 |
| 18 | 45 | 00 | 04 | Rotate valve to position 3 for fluid at PO1 |
| 18 | 45 | 00 | 05 | Activate event marker with output at PO2 |
| 28 | 00 | 00 | 0B | Turn off pump with output at LO1 |
| 28 | 15 | 00 | 0D | Turn off recorder with output at LO2 |

A total of ten instructions must be programmed into memory for this example. Fifty-four instructions and five outputs are not used.

In the operation the power switch S is closed and a particular memory module 51a is inserted in place. The reference time or clock pulse is applied to the counter 39 and the address outputs are applied to the memory so that the multiplexer will output the appropriate multiplexed time data. The loads will be operated according to the instructions in the program, and current time is displayed on the display element. The time display can be stopped manually by operating switch 62. The time display can be returned to zero by actuating switch 68 and can be advanced up or down by actuating switch 49. The memory module 51 can be replaced at any time during the cycle. The memory module can be erased using an ultraviolet light source.

Manual switch positions for on, off, and pulse override the run position. In other words, if relay switch S7 is in the on position and an instruction calls for turning the relay off, the relay would remain on. Run positions are for the programmed time mode.

When time programs need to be changed during an ongoing experiment, a separate memory can be programmed with the required changes and inserted into place with the new program. This is the advantage of off-line programming and verification. Memory should not be removed at the time an output function is programmed. When memory is removed from the apparatus all instructions act like an NOP instruction. However, outputs can be activated with the manual switches when memory is removed. For repeated applications, memory modules can be saved because the memory is non-volatile.

By way of illustration only and not by way of limitation, there are listed below devices all of which are integrated circuits that have been found suitable for use in the illustrated circuits:

| I.D. | Ref. Nos. | Mfg. and/or Part No. |
|------|-----------|----------------------|
| Dual complementary pair and inverter | 86 | 4007 |
| Dual JK flip-flop | 89 | 4027 |
| 14-stage binary/ripple counter | 91 | 4020 |
| Hex buffer/converter (non-invert) | 96, 97 | 4050 |
| Six-decade counter/display decoder | 39 | MK50396N |
| Triple 3 input OR gate | 121 | 4075 |
| Hex gate | 99 | 4572 |

-continued

| I.D. | Ref. Nos. | Mfg. and/or Part No. |
|---|---|---|
| 8-bit parallel-out serial shift reg. | 57 | 74C154 |
| Quad 2 input NAND | 113 | 4011 |
| Hex buffer/converter (inverting) | 127 | 4049 |
| MOS, E-Prom | 51 | MM1702A |
| Level translators/buffers | 131,132 | DS 8819 |
| Tri-state hex buffer | 134,135 | 80C97 |
| Quad 3 state NAND R/S latch | 129 | 4044 |
| 7 NPN Darlington | 84,117 | MC1416P |

The present invention as above described provides a relatively simple, economical design for laboratory, industrial and field applications. There is provided programmed stopping at the end of a selected duty cycle. There are a manual control and a visual display of all control outputs. There is a battery supply backup for power interruptions. The reference timing is not dependent on 60 Hz line frequencies. The programming is done off-line, enabling a rapid change in program times. There is associate timing over a selected time span.

Although the present invention has been described with a certain degree of particularity, it is understood that the present disclosure has been made by way of example and that changes in details of structure may be made without departing from the spirit thereof.

What is claimed is:

1. An improved programmable test control apparatus comprising:
   timing means for providing a reference time output during a test cycle,
   a plurality of storage means pre-programmed with instruction data and time data and responsive to said reference time output for producing instruction data and time data outputs according to selected program,
   a circuit means coupled to said storage means and said timing means including a comparator for comparing all time data in said storage means with said reference time output and producing a synchronous output when the reference times and storage times are equal,
   decoding means coupled to an inserted one of said plurality of storage means and said circuit means responsive to said synchronous output for decoding the instruction data and time data outputs from said inserted storage means into a plurality of different control outputs at programmed times for sequentially actuating a plurality of different electrically actuated loads, said decoding means being further responsive to the presence of predetermined instruction data and time data for selectively stopping and resetting said timing means at the end of said test cycle,
   means connected to said decoding means for displaying which of said control outputs become activated at said programmed times,
   means connected between said decoding means and said displaying means for overriding said storing means by manually activating selected ones of said control outputs, and
   each of said plurality of program storage means being capable of being preprogrammed and each being further capable of being selectively and manually insertable into said programmable time control apparatus at any time during the operation of said programmable time control apparatus by manually activating said overriding means during said selective insertion of said preprogrammable storage means.

* * * * *